United States Patent [19]

Crlenjak et al.

[11] Patent Number: 5,606,767

[45] Date of Patent: Mar. 4, 1997

[54] VACUUM OPERATED DUST AND DEBRIS REMOVAL AND COLLECTION SYSTEM

[76] Inventors: Jack Crlenjak, P.O. Box 236, Ferndale, Calif. 95536; Steven F. Caserza, 5057 Forest Glen Dr., San Jose, Calif. 95129

[21] Appl. No.: 446,016

[22] Filed: May 19, 1995

[51] Int. Cl.$^6$ .................... F23J 1/00; A47L 5/38
[52] U.S. Cl. .................... 15/301; 15/314; 15/331; 15/339
[58] Field of Search .................... 15/301, 314, 339, 15/331

[56] References Cited

U.S. PATENT DOCUMENTS

| | | | |
|---|---|---|---|
| 1,048,477 | 12/1912 | Allington | 15/301 X |
| 3,332,218 | 7/1967 | O'Dell | 137/625.15 X |
| 3,343,197 | 9/1967 | Carsey | 15/314 X |
| 3,566,921 | 3/1971 | Bell et al. . | |
| 3,628,769 | 12/1971 | Lee . | |
| 3,655,927 | 4/1972 | Samuelson et al. . | |
| 3,669,145 | 6/1972 | Holstrom . | |
| 3,906,584 | 9/1975 | Hult . | |
| 4,615,069 | 10/1986 | Henning . | |
| 4,941,230 | 7/1990 | Lamore | 15/314 |
| 4,977,638 | 12/1990 | Best | 15/314 X |
| 5,099,544 | 3/1992 | Yamamoto . | |
| 5,191,673 | 3/1993 | Damizet . | |
| 5,274,878 | 1/1994 | Radabaugh et al. . | |
| 5,279,016 | 1/1994 | Klassen . | |
| 5,316,042 | 5/1994 | Lim et al. | 137/625.15 X |

OTHER PUBLICATIONS

Fine Woodworking, May/Jun. 1994, Taunton Press, Newtown, CT, 06470, p. 104.
Woodworker's Journal, Nov./Dec. 1994, p. 10.

Primary Examiner—Chris K. Moore
Attorney, Agent, or Firm—Steven F. Caserza; Flehr, Hohbach, Test, Albritton & Herbert

[57] ABSTRACT

A novel dust and debris removal and collection system including a distributed vacuum transport system is provided for connection to a plurality of machines located in one or more shop areas. The central vacuum airflow generation equipment is preferably remotely operated to ensure vacuum generation when a machine is being operated for which dust and debris removal is desired. In order to prevent undesired loss of vacuum, a central valve is used having a outlet port for connection to one or more vacuum sources, and a plurality of inlet ports, each associated with one of a plurality of machines located in the one or more shop areas. The central valve is operated to apply vacuum from the one or more vacuum sources to only that one of the plurality of machines which is in operation, thereby preventing a loss of vacuum to other, non-operating machines. In one embodiment, a plurality of such central valves are used to enable a plurality of machines to be used simultaneously and receive vacuum, each of the machines being operated at any given time being associated with different banks of machines, each bank of machine being associated with its own one of the central valves.

16 Claims, 10 Drawing Sheets

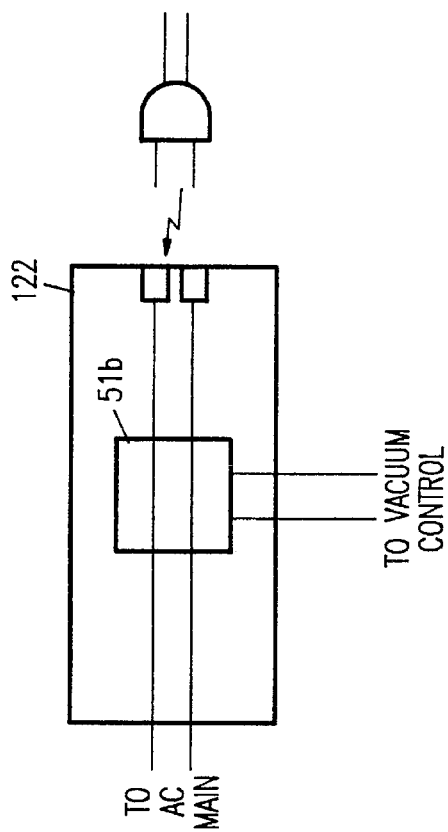
FIG. 5h
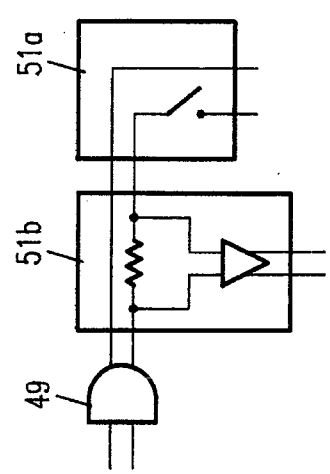
FIG. 5f
FIG. 5g

VACUUM OPERATED DUST AND DEBRIS REMOVAL AND COLLECTION SYSTEM

INTRODUCTION

1. Field of Invention

This invention pertains to debris removal systems, and more specifically to debris removal systems utilizing vacuum airflow in order to gather and transport debris from a plurality of workstations for central collection.

BACKGROUND OF THE INVENTION

2. Description of Prior Art

Vacuum cleaners are well known and serve an important function in gathering dust and debris in a variety of situations. Household vacuum cleaners, for example, may employ beaters for working dust and debris out of a carpet for removal to a canister or upright style vacuum cleaner collection bag. In certain household systems, a centralized vacuum is provided, wherein the collection-bag and vacuum motor and generation system are located centrally, perhaps in the garage, with the vacuum being routed to various rooms within the house utilizing fixed airflow conduits installed within the walls and accessible in each room utilizing an outlet to which a hose or other vacuum cleaning device can be attached in order to make use of the distributed vacuum. In order to prevent a loss of vacuum from access ports which are not being used for actual vacuum cleaning in a particular time, those ports include covers which serve to block the port, thereby maintaining system vacuum. Vacuum debris removal and collection systems are also useful in shop areas, for example, a home workshop, or industrial shops, such as woodworking shops and machine shops. For example, a number of tools employ dust removal and collection systems. One such tool is a belt driven portable sander, which includes a dust collection bag mounted on it so that as sanding takes place, saw dust is collected within the bag. Other, larger shop machines are designed for permanent or temporary placement at a fixed location, such as a table saws, drill presses, milling machines, joiners, planers, sanders, radial arm saws, and the like. Each of these machines is capable of generating a significant amount of debris and dust in its operation. For this reason, a number of such machines are designed to possibly collect such dust and debris, for example by including within a table saw a box or bin for collecting dust and debris which fall by gravity.

Other ones of these machines are available which include a port for the attachment of a vacuum cleaner hose, such as might be attached to a standard canister-type shop vac which, by means of the vacuum airflow, remove and collect dust and debris. As depicted in FIG. 1, such machines are operated so that the user will manually move the canister-type vacuum cleaner to the general location of the machine to be used and manually attaches a flexible vacuum hose from the canister vacuum cleaner to the machine to be used. The user then turns on the vacuum cleaner and then turns on and utilizes the shop machine, with the vacuum cleaner removing and collecting the dust and debris so generated.

This sort of system is used both in the home or small industrial workshop, for example, by utilizing machines available from Sears Roebuck & Company of Chicago, Ill. which include the vacuum port for the manual attachment of a vacuum hose. This system is also used in larger industrial applications, such as in cabinet making and woodworking shops, in which a canister-type vacuum cleaner or a more sophisticated and expensive sawdust and debris collection machine including a vacuum airflow generator is used in the same fashion, i.e. manually transported through the shop area to the machine to be used, manually connected, manually turned on and off.

As a purported advancement over this prior art, Sears Roebuck & Company has made available, as depicted in FIG. 2, implements for connecting in a permanent fashion a vacuum distribution system capable of supplying a vacuum from a centrally located vacuum airflow device such as a canister-type vacuum cleaner 20 to a plurality of machines 21, 22, 23 located in a small shop area, including manually operated cut-off valves 25, 26, 27 at each machine in order to maintain system vacuum by not applying the system vacuum to other than the single machine being utilized at any given time. However, this system requires each cutoff valve to be manually closed when not in use, a step which is often forgotten. This system also requires each cutoff valve to be manually opened when a machine is turned on, another step which is often forgotten. Yet another disadvantage of this system is that the centrally located vacuum cleaner must be turned on at that central location in order for the debris removal and collection system to operate. Yet another disadvantage is the inconvenient placement of the cutoff valves which, due to the configuration of the carrier ducting, are not easily accessible by the machine operator. This requires extra steps or reaching over or behind a machine to manually operate the cutoff valve, which is likely to be a hazard. In practice, as determined by operational testing, such manually operated cutoff valves are likely to be left open, even when the associated shop tool is not in use, thereby decreasing the amount of vacuum available to shop tools that are actually in use. Such systems also require the vacuum source to be located in or near the shop tool area, to allow for relative ease in allowing a user to manually control the electrical power to the vacuum source. This takes up valuable shop area floor space, and increases the noise in the shop area due to the proximity of the vacuum source.

Larger, more expensive systems include a central vacuum generator and ducting connecting to a plurality of shop machines, and including automatic dampers for connecting the vacuum duct to a specific shop machine only when that machine is turned on. Such electrically or pneumatically controlled dampers are available from Northfab Systems, Inc., of Thomasville, N.C. Such industrial systems are quite bulky and expensive and are designed for use with a large vacuum generation source with large ducting, such as 6 inches or larger for connecting a significant number of machines, any number of which can be in operation at any given time. These automatic dampers are large and expensive, and require pneumatic or electronic controls built in to the rather sophisticated shop tools of such an establishment in order to function properly and automatically.

While the removal and collection of debris and dust may seem merely a nicety, it should be understood that such debris and dust can contribute to a number of significant and costly problems. First of all, dust build-up is a fire and explosion hazard. Secondly, health is adversely effected by breathing and ingesting quantities of dust. Dust and perhaps more significantly small bits of debris flying around a shop area can be a significant nuisance by covering workers with this dust and debris and perhaps cause eye and sinus problems as well. Furthermore, dust covered floors and other surfaces cause safety hazards, such as slippage, and provide an unprofessional appearance to customers and employees. OSHA and other safety standards usually require face masks to reduce such risks but even these requirements, if used at all, are inconvenient and not foolproof.

SUMMARY

In accordance with the teachings of this invention, a novel dust and debris removal and collection system is taught. In accordance with this invention, a distributed vacuum transport system is provided for connection to a plurality of machines located in one or more shop areas. The central vacuum airflow generation equipment is preferably remotely operated to ensure vacuum generation when a machine is being operated for which dust and debris removal is desired. In order to prevent undesired less of vacuum, a central valve is used having a outlet port for connection to one or more vacuum sources, and a plurality of inlet ports, each associated with one of a plurality of machines located in the one or more shop areas. The central valve is operated to apply vacuum from the one or more vacuum sources to only that one of the plurality of machines which is in operation, thereby preventing a loss of vacuum to other, non-operating machines. In one embodiment, a plurality of such central valves are used to enable a plurality of machines to be used simultaneously and receive vacuum, each of the machines being operated at any given time being associated with different banks of machines, each bank of machine being associated with its own one of the central valves. In another embodiment, distributed valves are used as in the prior art, but with novel switch mechanisms which are plugged into an AC outlet and into which a shop machine is plugged. This switch device either senses current drawn by the shop machine or includes a switch which is operated in order to provide power into the machine and, in so doing, provides a signal indicating that the distributed vacuum valve associated with that machine is to be opened.

BRIEF DESCRIPTIONS OF THE DRAWINGS

FIGS. 5a–5h depict various embodiments of this invention, specifically embodiments for generating control signals for controlling one or both of the vacuum motor and one or more vacuum distribution valves;

DETAILED DESCRIPTION

In accordance with the teachings of this invention, a novel distributed vacuum airflow debris and dust removal and collection system is taught which is particularly useful for the home workshop and small commercial workshops by providing an adequate source of vacuum for debris and dust removal and collection at low cost and which is capable of utilizing, for example, existing vacuum ducting and existing vacuum ported shop tools. In fact, the present invention allows for the easy retrofitting of existing shops with minimal additional expense or effort.

Figure 1:
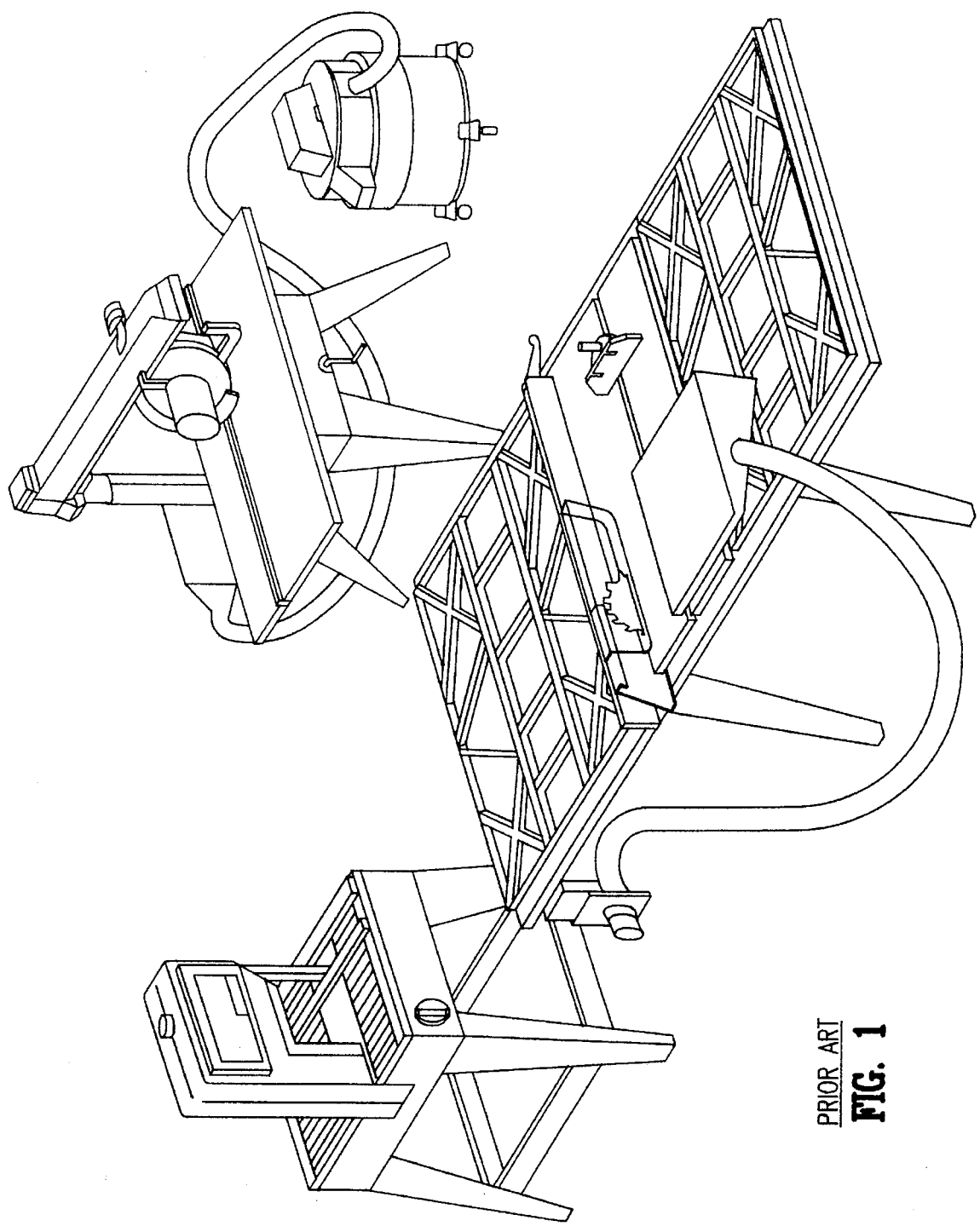
FIG. 1 is a typical prior art debris removal and collection system including a plurality of shop tools and a movable vacuum cleaner for manual connection to a desired one of the shop tools.
Figure 2:
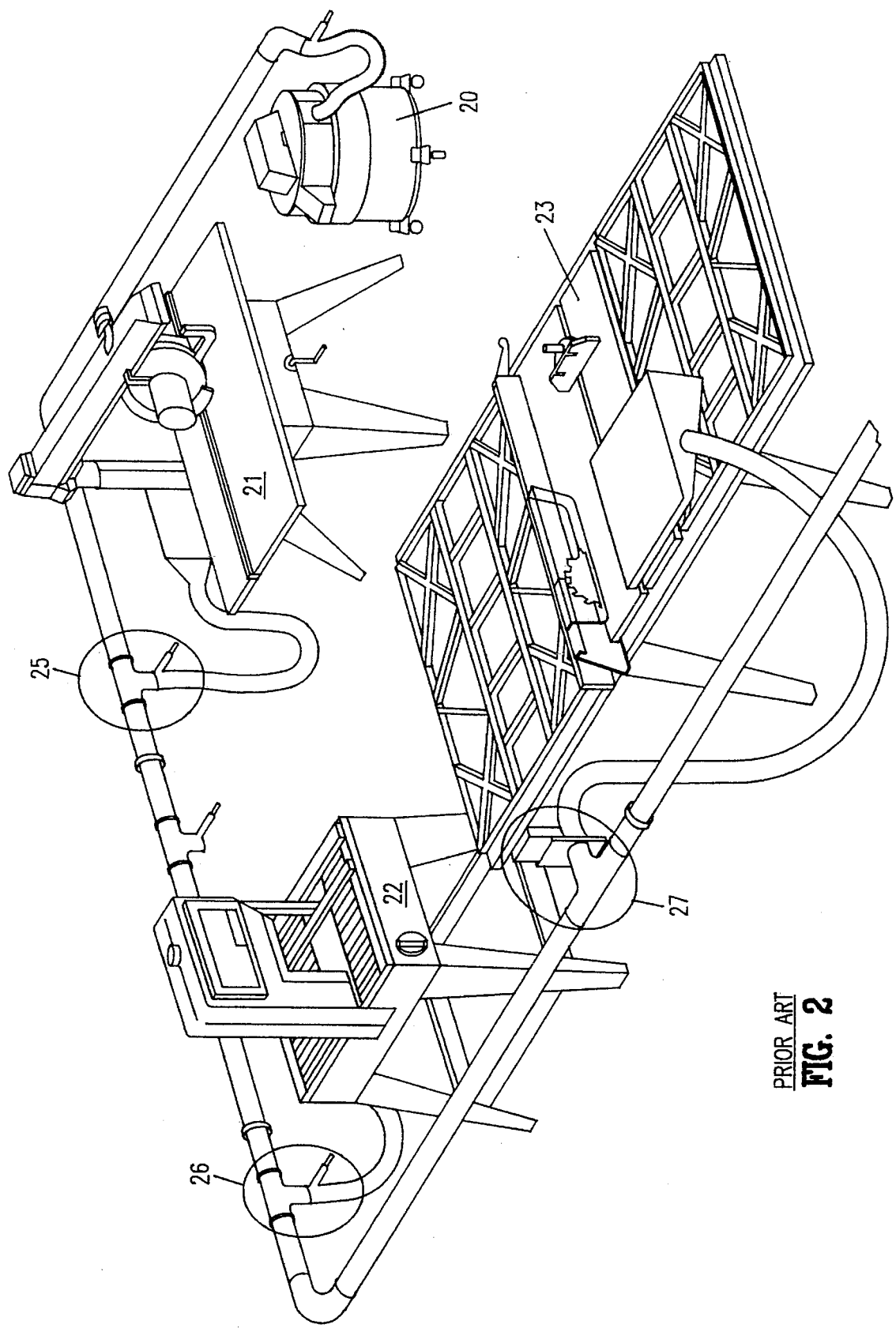
FIG. 2 is a diagram depicting a prior art debris removal and collection system utilizing a central vacuum and collection device and distribution tubing, including manually controlled valves associated with each shop tool.
Figure 3:
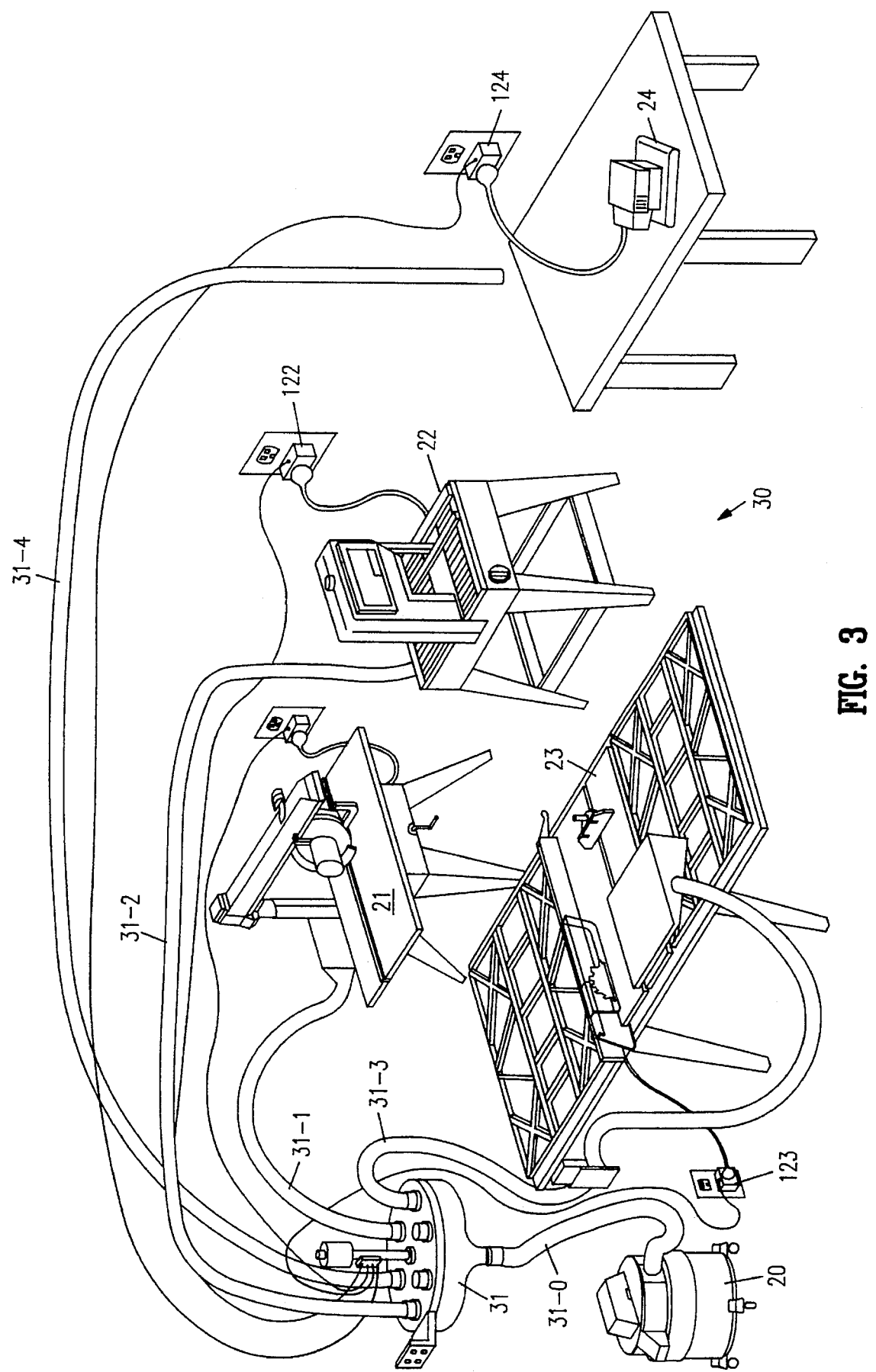
FIG. 3 is a diagram depicting one embodiment of the present invention, including a central vacuum and collection device, distribution tubing, and a centrally located vacuum distribution valve.

FIG. 3 is a diagram depicting a shop system 30 constructed in accordance with this invention including a plurality of shop tools 21, 22, and 23, each fitted with a vacuum port for the receipt of vacuum for the purpose of dust and debris collection and removal. Shown in FIG. 3, system 30 includes a vacuum source, such as canister type vacuum cleaner 20 which is inexpensive, is often already available in a shop environment, and which has a port suitable for relatively inexpensive and readily available ducting. Of course, any suitable vacuum source can be used. System 30 also includes a novel central vacuum valve 31 including one or more outlet ports 31-0 connection to vacuum source 20, and a plurality of inlet ports for connection by ducting to areas where dust and debris is to be collected and removed. For example, shown in the exemplary system 30 of FIG. 3, central vacuum valve 31 includes a plurality of ports connected by vacuum ducting 31-1 to shop tool 21, vacuum ducting 31-2 to shop tool 22, and vacuum ducting 31-3 to shop tool 23. Unused inlet ports of central vacuum valve 31 are easily capped off, if desired, to prevent possible loss of vacuum while allowing for easy expansion of the shop by the addition of new shop tools which are conveniently connected via the ducting to available vacuum outlet ports of central vacuum valve 31.

As shown in FIG. 3, certain types of shop tools which are capable of generating dust and debris are not already ported for the application of a vacuum conduit. As shown in FIG. 3, one such tool is a hand held sander, although certain other power tools such as hand held grinders and hand drills fall in this category as well. Furthermore, there are in existence a large number of shop tools which are not vacuum ported and it is desirable in certain circumstances to use such existing shop tools rather than to buy a substantially identical replacement solely for the purpose of including a vacuum port. Thus, system 30 of FIG. 3 includes one or more additional vacuum conduits such as vacuum conduit 31-4 which can be used for the manual vacuuming of dust and debris from certain work areas such as the table upon which hand held sander 24 is used. Additional tools can be utilized on the work table in addition to or in place of hand held sander 24, with no modification to the electrical system needed, with vacuum conduit 31-4 being used, with or without branching mechanisms, to remove dust and debris from the work table. Current sensing or other switching device 124 can be used with the tools utilized on the work bench, as is more fully described later.

Central vacuum valve 31 includes a mechanism for routing the vacuum applied from the vacuum generator 20 via the outlet conduit 31-0 to only one of the inlet ports of central vacuum valve 31. This allows the full vacuum developed by vacuum source 20 to be applied to the work area which is in operation and without loss of vacuum which often results in the prior art systems in which a valve associated with a given machine is forgetfully left open when that machine is no longer in use. The system of this invention also allows a relatively small vacuum generation source 20 to be used since there is such a prevention of loss of vacuum due to forgetfulness, resulting in a cost savings attendant with vacuum source 20, lower power consumption, and significantly less noise generation. Vacuum generation source 20 can also be located outside of the work area in order to further reduce noise from vacuum generation source 20, essentially to a zero noise level to the operators of the machinery with the appropriate placement and if necessary sound proofing of vacuum generation source 20. In this event, vacuum generation source 20 may be remotely controlled, either with a master power switch controlling its operation, or in conjunction with the operation of central vacuum valve 31 and, if utilized, sensing devices associated with various machines in the workshop. Furthermore, central vacuum valve 31 is a relatively simple device and a single device may be associated with a plurality of shop tools, thereby obviating the high cost of prior art automatic dampers which are practical only for extremely large shops.

Figure 4:
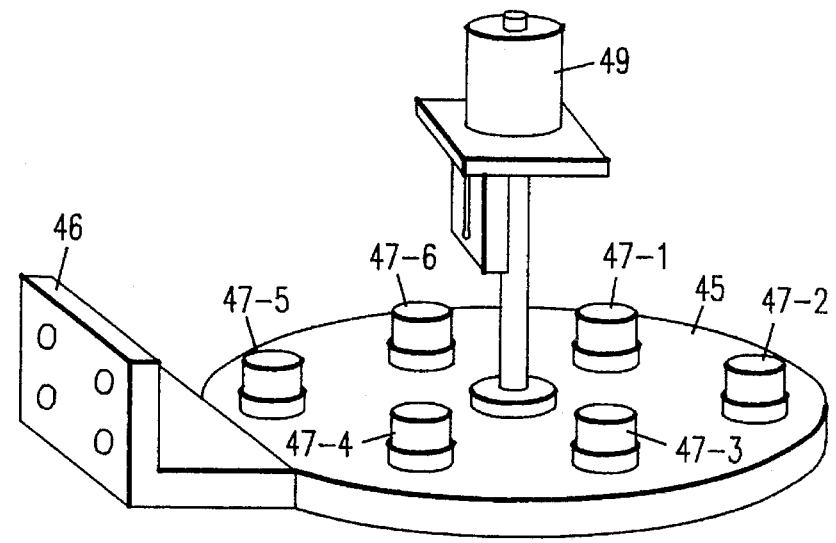
FIGS. 4 is a diagram depicting an exemplary embodiment of a vacuum valve suitable for use as valve 31 of FIG. 3.
Figure 4:
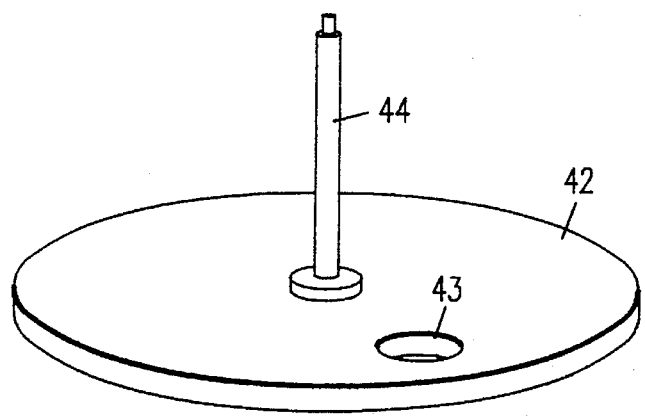
Figure 4:
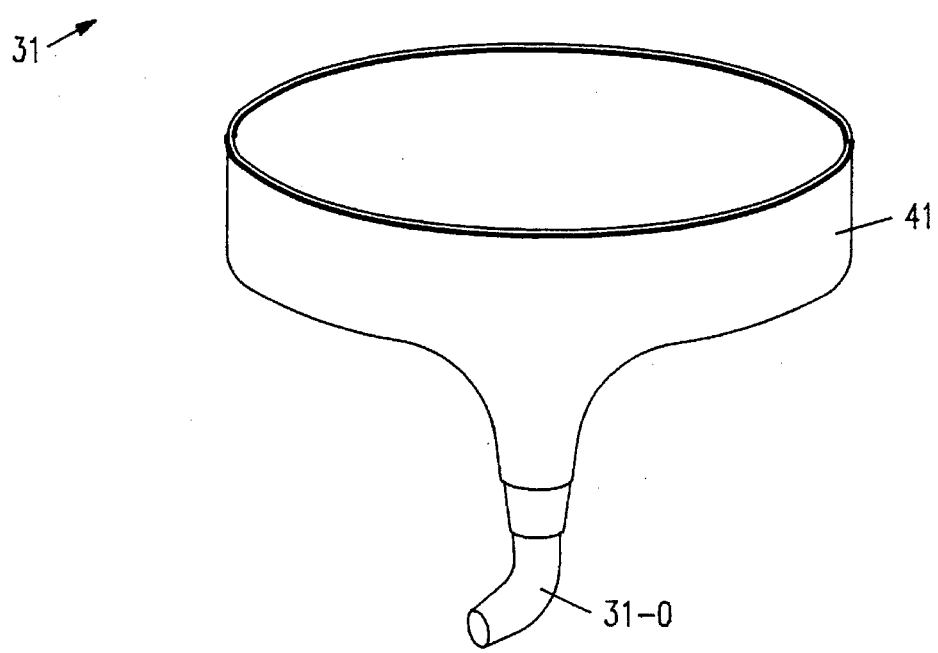

Central vacuum valve 31 can take any of a number of convenient forms. One such form is shown in the exploded view of central vacuum valve 31 depicted in FIG. 4. In the embodiment of FIG. 4, central vacuum valve 31 includes a funnel portion 41 to which outlet conduit 31-0 is attached. Central vacuum valve 31 also includes a top cover 45, including a plurality of inlet ports 47-1 through 47-6. If desired, one or both of funnel portion 41 and top lid 45 can include a mounting bracket, such as mounting bracket 46 shown in FIG. 4 attached to cover 45, allowing central vacuum valve 31 to be conveniently mounted at any desired location. Interior to central vacuum valve 31 resides disk 42 including aperture 43 defining which one of inlet ports 47-1 through 47-6 is to receive the vacuum supplied to funnel portion 41. Disk 42 is mounted on a shaft 44 so that disk 42 can be conveniently rotated to align opening 43 with the desired one of inlet ports 47-1 through 47-6. If desired, a detent of well known design (not shown) is used in order to ensure that disk 42 "snaps" into one of a preselected number of appropriate rotational positions, assuring that opening 43 is in fact aligned with one of inlet ports 47-1 through 47-6 at any given time.

In one embodiment, pliable rings or gasket are placed at the base of each inlet port 47-1 through 47-6 in order to seal against the top of disk 42. This ring or gasket provides an efficient vacuum seal when sealing power is applied via air suction when vacuum is applied to outlet port 31-0.

In one embodiment of this invention, shaft 44 is manually operated. This is a simple operation, and can be accomplished by the use of a handle including a pointer device (not shown) so that the user will clearly understand which vacuum port is being supplied with a vacuum as shaft 44 is rotated. If desired, the user can label each of the ports 47-1 through 47-6 in accordance with the shop tool to which it is associated. In this embodiment, if desired, associated with shaft 44 is a switch for controlling the operation of vacuum generator 20, so that when shaft 44 is rotated to a position for the supply of vacuum to one of the shop tools, vacuum generator 20 is automatically turned on. In this embodiment, the detent mechanism can allow for an off position of disk 42, in which the electrical switch controlling vacuum generator 20 is turned off and opening 43 is not aligned with any one of ports 47-1 through 47-6. Alternatively, a separately operated switch is located on or in close proximity to central vacuum valve 31 so that a user will manually turn the switch to control vacuum generator 20 and manually control the positioning of opening 43 by manually rotating shaft 44.

In an alternative embodiment of this invention, the rotation of shaft 44 is controlled automatically, for example by the use of stepper motor 49. Stepper motor 49 is coupled to shaft 44 and includes a number of discrete shaft positions corresponding to the alignment of hole 43 with each of inlet ports 47-1 through 47-6 (plus, if desired, an "off" position associated with an integral switch for control of vacuum generator 20. In one embodiment of this invention, stepper motor 49 is controlled by a separate switch located at or near each machine, such as machines 21–24 of the embodiment of FIG. 3. In a more sophisticated embodiment, control of stepper motor 49 is accomplished automatically in conjunction with the operation of each of the shop tools 21–24. In one such implementation, an extra set of contacts are made available on each of the shop tools to supply either AC line voltage, a low voltage AC signal, a DC control signal, or a non-powered switch contact to stepper motor 49 or a control system which in turn will operate stepper motor 49 to rotate shaft 44 to the appropriate rotational position. In one embodiment, this is easily accomplished by plugging a machine into a switch device placed between the machine plug and a wall outlet. This intermediate switch device must be turned on, in addition to the machine itself being turned on, in order to power the machine. However, when this intermediate switch device is on, an additional signal is made available to stepper motor 49 indicating the intention to power on that machine. This arrangement has another distinct advantage. When machine 22 is itself turned off but additional switching device 122 turned on, machine 22 is powered down but stepper motor 29 controls central vacuum valve 31 to apply vacuum via conduit 31-2 to machine 22. This allows a time lag in turning off machine 22 allowing additional dust generation and removal from machine 22. It also allows the user to manually remove hose 31-2 from machine 22 in order to perform a manual vacuuming operation on and around machine 22 for additional cleanliness.

In an alternative embodiment of this invention, switch unit 122 includes latching circuitry so that it will remain on until it is turned off or until another one of the intermediate switching devices is turned on. This has the advantage of addressing a user's forgetfulness. For example, if a user powers on machine 22 by turning machine 22 on and intermediate switch 122 on, all is well. Then suppose the user turns off machine 22 but forgets to turn off intermediate switch device 122. The user then goes over to use machine 23, powering it on by turning machine 23 itself on and intermediate switch 123. In this embodiment, this signals intermediate switch device 122 to turn off, as it is a reasonable presumption that machine 22 was no longer being used. This allows an unambiguous control of central vacuum switch 31 to the newly operated machine 23, and guarantees that machine 22 is powered down since vacuum is no longer supplied to machine 22. Alternatively, the control system operates to allow vacuum to be applied to machine 23 while removing the vacuum from machine 22 but allowing power to be applied by intermediate switch device 22 to machine 22, in the event that machine 22 is in fact still being operated. During this time, however, vacuum will not be available to machine 22, at least until such time as the user turns off intermediate switch device 123.

Figure 5D:
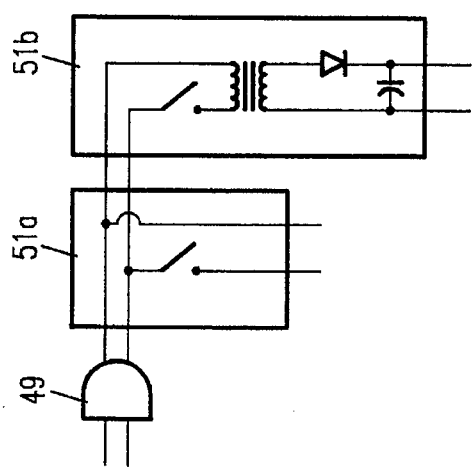
Figure 5E:
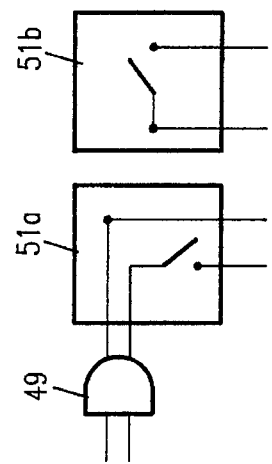
Figure 5C:
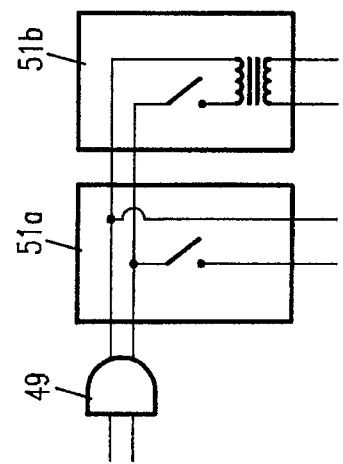
Figure 5A:
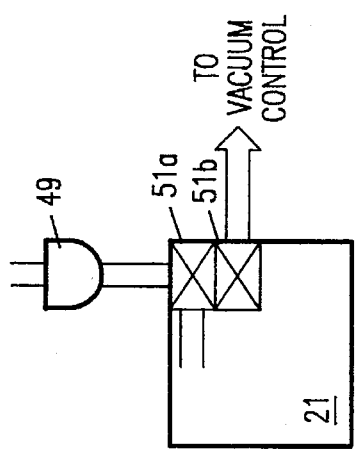
Figure 5B:
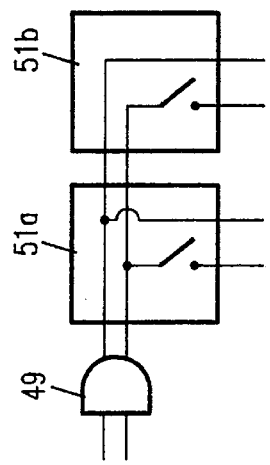

In yet another embodiment of this invention, intermediate switch device 122 does not require manual activation by a user. Instead, the user simply activates the normal electrical power switch of a given machine, such as machine 22, and intermediate switching device 122 senses current flow from the AC lines to machine 22. In response to this sensing of power draw, intermediate switch device 122 sends an appropriate signal to stepper motor 49 or its electrical controls, indicating that machine 22 is in use and that vacuum should be made available thereto. As depicted in FIG. 5a, a given workshop machine 21 includes two switches 51a and 51b. As shown in FIG. 5a, AC line voltage is applied via, for example, plug 49 to machine 21 via switch 51a. Switch 51b provides an appropriate signal to the vacuum control mechanism, which signal can be either an AC line voltage (as depicted in FIG. 5b), a low voltage AC signal (as depicted in FIG. 5c), a DC voltage (as depicted in FIG. 5d), a dry contact, which can be either normally open or normally closed (as shown for the normally open embodiment in FIG. 5e). In each of these embodiments, the two switches 51a, 51b can either be separately controlled allowing a user to individually control machine 21 and the vacuum applied to machine 21. Alternatively, switches 51a and 51b can be mechanically ganged together so that vacuum is always applied to machine 21 when machine 21 is powered on. In another embodiment, a mechanism is provided such that vacuum is always applied to machine 21 when machine 21 is powered on by switch 51a, but which also allows the user the option to manually apply vacuum to 21 in order to provide further debris and dust removal. In another embodiment, in addition to vacuum being applied during the operation of machine 21, vacuum continues to be applied to machine 21 for a predetermined period of time after machine 21 is shut off, thereby facilitating improved debris and dust removal from machine 21. Such timing mechanism can be either applied at the vacuum control station with either a prefixed setting for all machines, or individual settings associated with each machine, or the time delayed signal can be provided via selected ones of switches 51b in order to provide the vacuum after power shut off to a given machine based on the nature of that machine.

FIG. 5f depicts one embodiment of this invention in which "switch" 51b in fact is a current sensor which senses current being drawn from AC line 49 by machine 21 when switch 51a is operated. FIG. 5f shows one embodiment in which switch 51b includes a series connected transformer primary in the switched AC line providing a sense signal indicating when current is being drawn by machine 21. This AC sense signal can, if desired, be rectified (such as in the manner shown in FIG. 5d) to provide a DC sense signal. Furthermore, the AC or DC sense signal can be amplified if desired in a well known manner. Alternatively, the series connected transformer can be replaced with a Hall Effect device or other current sensing device for the same purpose. FIG. 5g shows an alternate embodiment of an automatic current sensing mechanism in which a shunt resistor is connected in series with the switched AC line, with amplification being provided in order to provide a buffered current sense signal.

In one embodiment, switch 51b is conveniently formed as a separate switch which is plugged into an AC outlet and into which a shop tool is plugged, as shown in FIG. 5h. In this manner, any existing shop tool can be utilized without electrical retrofitting, as shown in FIG. 3 with respect to switch 122 used with machine 22, for example. This means that the teachings of this invention can be used without retrofitting or electrical rewiring of tools or shop areas and thus can be put in place extremely and expensively in shops from the smallest private non-commercial shops, through small commercial shops, through the largest industrial shops.

As depicted in FIG. 3, any number of additional vacuum hoses such as vacuum hose 31-4 can be made available at various locations throughout the shop for normal manual vacuuming, with a given hose being enabled by the manual operation of central vacuum valve 31 or a remote control, such as by use of intermediate switch device 124.

In one embodiment of this invention, intermediate switch devices such as devices 122 through 124 and/or the vacuum control signal provided by switch 51b of FIG. 5a, communicate with stepper motor 49 or its controls by control signals modulated on the AC mains, or utilizing RF, ultrasonic, infrared, or audible control signals transmitted to stepper motor 49, or control circuitry driving stepper motor 49.

If desired, and in accordance with the teachings of this invention, vacuum is not terminated to a given machine immediately when that machine is powered down, but rather is applied for a predetermined time period after the machine is powered down, in order to provide enhanced dust and debris removal. Alternatively, dust sensors are employed in order to allow the vacuum to continue to be applied to a given machine until the level of dust in the area to be cleaned by the vacuum source, or within the ducting itself, reaches a predetermined and sufficiently low level.

Figure 6:
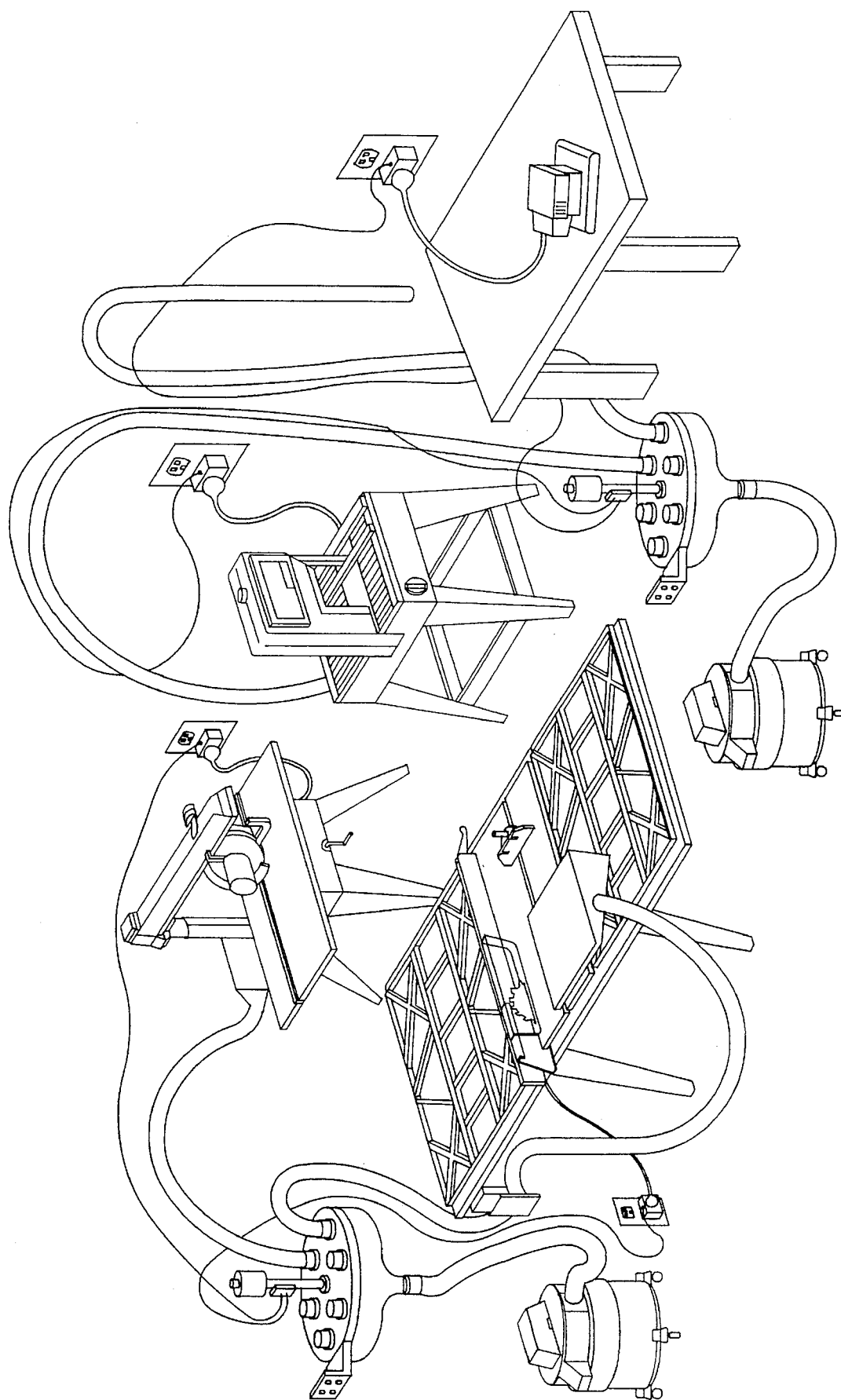
FIG. 6 is a diagram of one embodiment of this invention utilizing a plurality of vacuum generation and collection devices.

FIG. 6 is a diagram depicting one embodiment of this invention which utilizes a plurality of vacuum sources and a plurality of centralized vacuum distribution valves so that a larger shop area can be controlled inexpensively and, in so doing, more than one machine can be supplied vacuum simultaneously.

Figure 7:
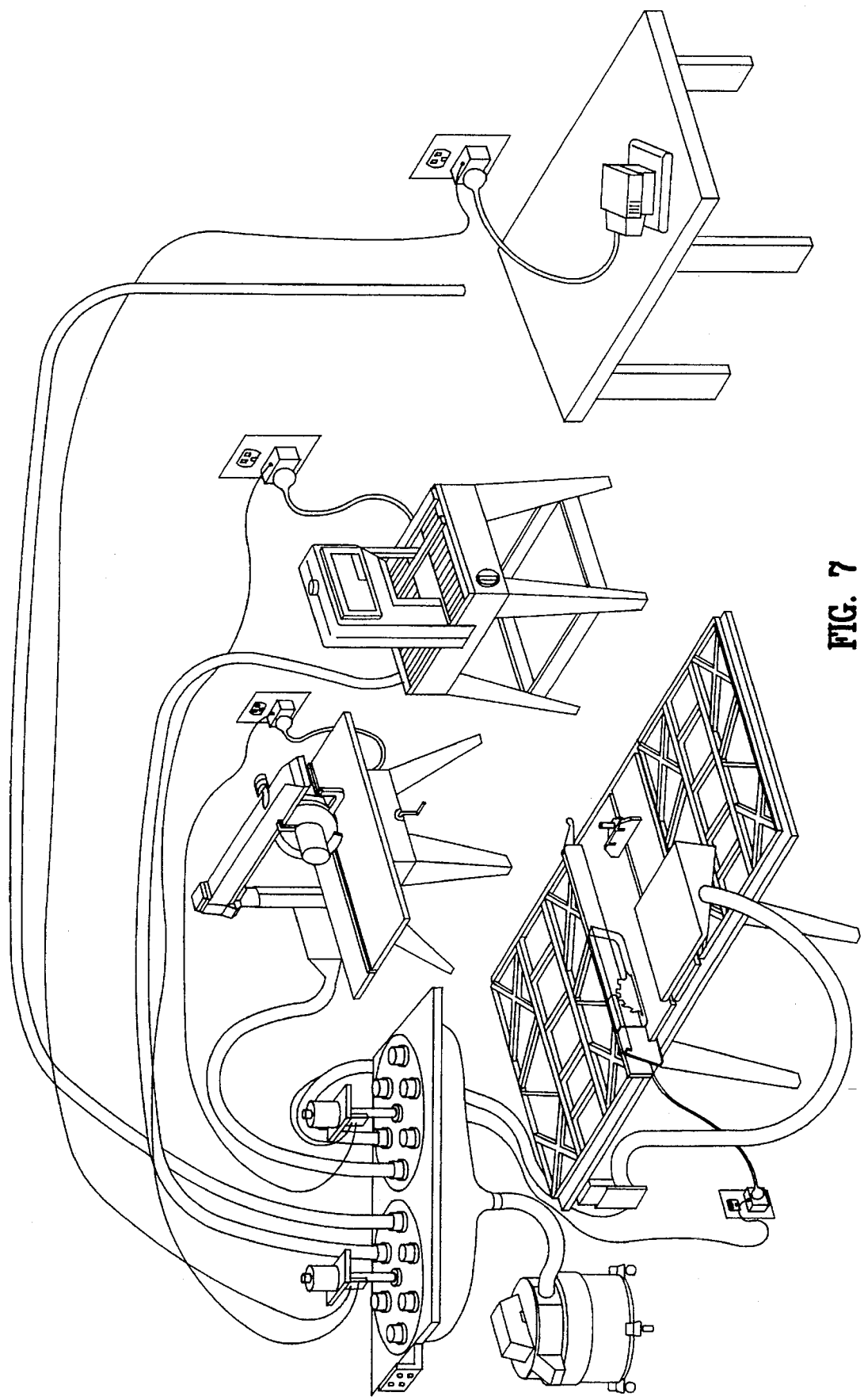
FIG. 7 is a diagram of one embodiment of this invention utilizing a plurality of vacuum distribution valves on one or more central vacuum collection devices to allow more than one machine to be operated simultaneously.

FIG. 7 is a diagram depicting an alternative embodiment of this invention showing one or more vacuum sources and a plurality of centrally located vacuum distribution valves which may be, if desired, conveniently formed as a single integral device as shown in FIG. 7. As shown in FIG. 7, as in FIG. 6, a plurality of shop tools can receive vacuum for the removal of dust and debris simultaneously. It is also within the scope of this invention that a greater number of vacuum sources can be utilized in order to provide the appropriate amount of vacuum including, if desired, vacuum sensors which will turn on additional vacuum sources when it is detected that the vacuum level is not adequate. Furthermore, any number of central vacuum distribution valves can be utilized in order to operate any desired number of machines within any desired number of vacuum zones within a shop area.

Figure 8:
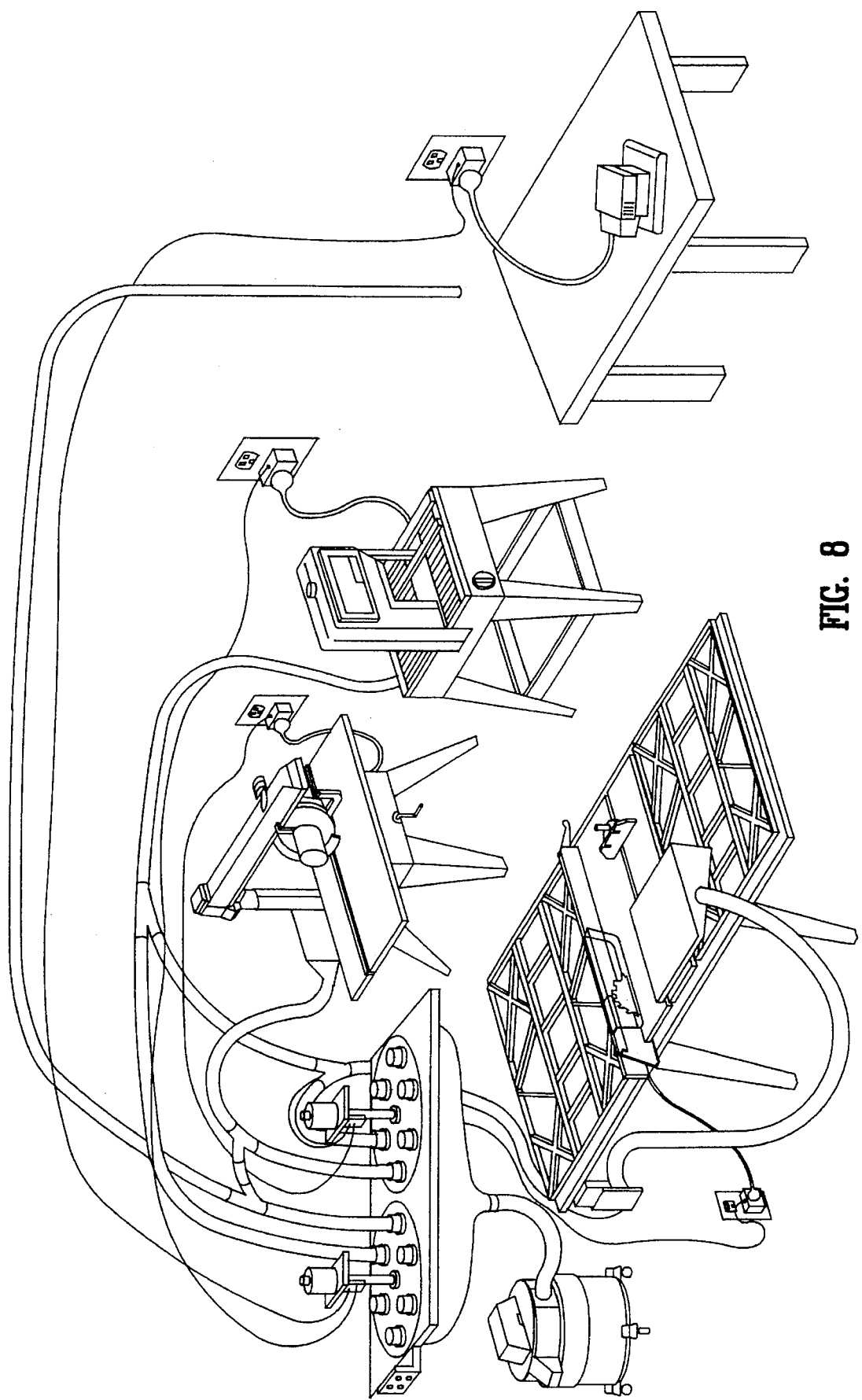
FIG. 8 is a diagram of an alternative embodiment of this invention utilizing a plurality of vacuum distribution valves on one or more central vacuum collection devices.

FIG. 8 is a diagram depicting an alternative embodiment of this invention sharing one or more vacuum sources and a plurality of centrally located vacuum distribution valves, together with appropriate ducting which will allow any one of a plurality of machines to be used simultaneously with any of the other ones of said plurality of machines.

Figure 9:
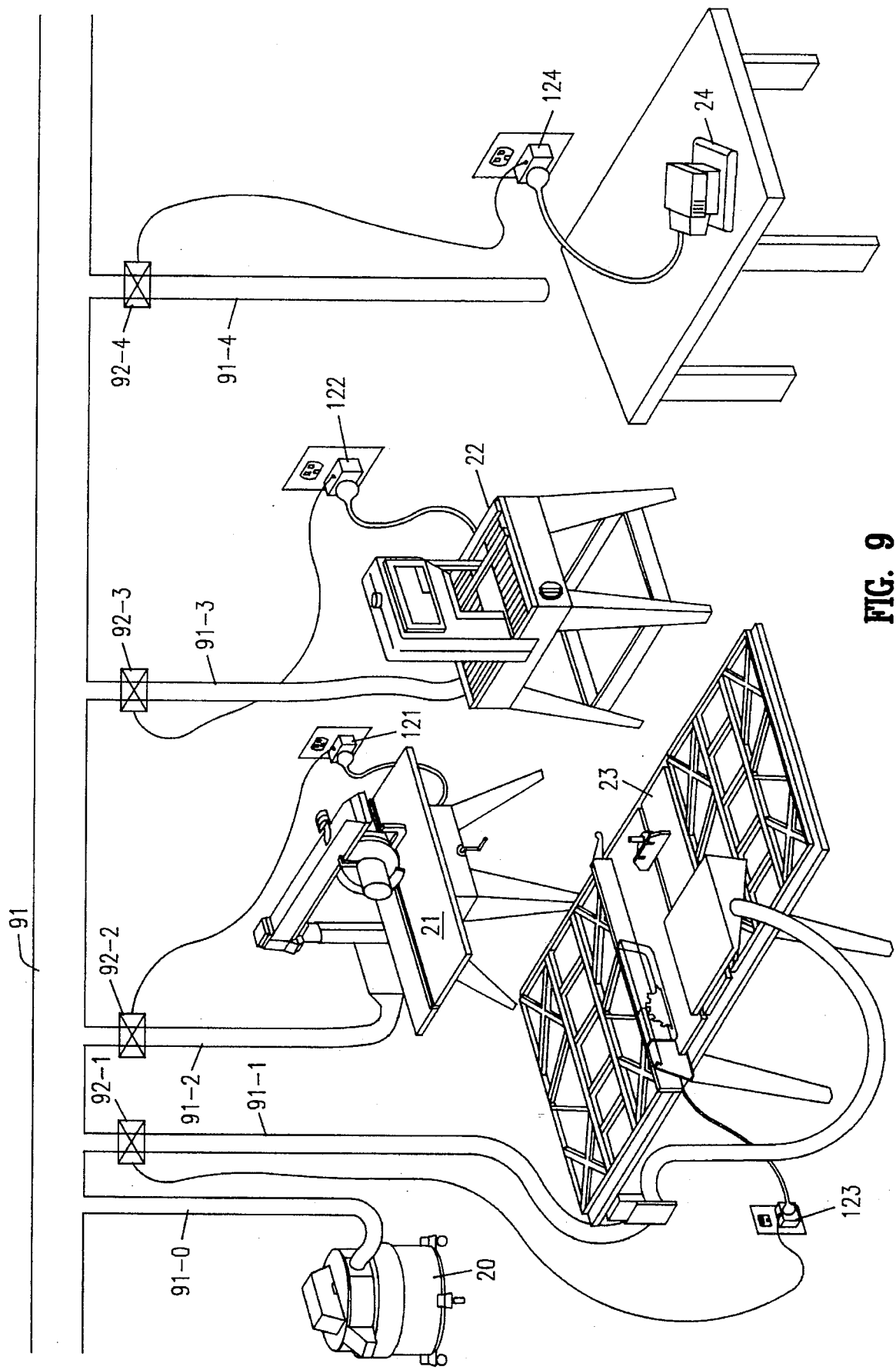
FIG. 9 is a diagram depicting an alternative embodiment of this invention utilizing distributed vacuum valves and retrofit switches and/or current sensors for operating the distributed vacuum valves.

FIG. 9 is a diagram depicting an alternative embodiment of this invention utilizing a main vacuum duct 91 to which vacuum is applied by one or more vacuum devices 20 via associated ducts 91-0. A plurality of machines, such as machines 21 through 24 are provided each having an associated vacuum duct 91-1 through 91-4 for removing dust and debris from the machine. Each vacuum duct 91-1 through 91-4 includes a vacuum valve 92-1 through 92-4, respectively, so that vacuum is provided by vacuum duct 91 to a machine only at an appropriate time, such as when the machine is turned on. In accordance with the teachings of this embodiment, a novel switch mechanism (121 through 124) is associated with each of the machines 21 through 24 and thus with the corresponding vacuum valves 92-1 through 92-4. The switch mechanism 123 through 124 can be provided as described earlier with respect to the embodiments of FIGS. 3 and 5a through 5h so that they may provide an appropriate signal to their associated vacuum valves and, if desired, to control the operation of the vacuum generation unit 20 as well. This allows the easy retrofitting of an existing shop or shop machines by the simple use of switching mechanisms such as switching mechanism 123, rather than a redesign or retrofit of the machine itself.

Also, particularly with remote versions, shop and vacuum machines are capable of being placed in any number of separate areas for safety, noise considerations and ease of placement when space is at a premium.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed:

1. A vacuum operated dust and debris removal and collection system comprising:
   a vacuum source;
   a plurality of dust and debris inlet ports, each for admitting dust and debris from an associated work area;
   a vacuum distribution valve comprising:
     an outlet port;
     a plurality of inlet ports; and
     a valve mechanism for coupling said outlet port to one of said inlet ports;
   a vacuum conduit for coupling said vacuum source to said outlet port of said vacuum distribution valve; and
   a plurality of vacuum conduits, each coupling one of said inlet ports of said vacuum distribution valve to the associated one of said dust and debris inlet ports,
   wherein said vacuum distribution valve is controlled in response to an electrical signal associated with one of said work areas to which vacuum is to be directed.

2. A structure as in claim 1 wherein said vacuum distribution valve comprises a plurality of said inlet ports arranged circumferentially and a rotatable disk having a through passage capable of being lined up with an associated one of said inlet ports which is to be the recipient of said vacuum.

3. A structure as in claim 2 wherein said disk is rotated by means of an electrically operated actuator.

4. A structure as in claim 3 wherein said actuator comprises a stepper motor.

5. A structure as in claim 1 wherein said electrical signal comprises a signal derived from the switch of an associated shop machine.

6. A structure as in claim 5 including a timing device such that said vacuum remains applied to said associated shop machine for a predetermined period of time after said machine is turned off.

7. A structure as in claim 5 which further comprises a dust sensor which causes said vacuum to continue to be applied to said associated shop machine after said shop machine is turned off until said sensor determines that the dust level has decreased to a predetermined threshold level.

8. A structure as in claim 1 wherein said electrical signal is derived by sensing the current drawn by said associated shop machine.

9. A structure as in claim 8 including a timing device such that said vacuum remains applied to said associated shop machine for a predetermined period of time after said machine is turned off.

10. A structure as in claim 8 which further comprises a dust sensor which causes said vacuum to continue to be applied to said associated shop machine after said shop machine is turned off until said sensor determines that the dust level has decreased to a predetermined threshold level.

11. A vacuum operated dust and debris removal and collection system comprising:
    a vacuum source;
    a plurality of dust and debris inlet ports, each for admitting dust and debris from an associated work area;
    a plurality of vacuum valves each coupling said vacuum source to an associated one of said dust and debris inlet ports; and
    a switch for controlling at least one of said vacuum valves, said switch comprising:
      a plug for insertion into a power main;
      a connection for providing power to an associated machine; and
      a signal port for providing a control signal to said vacuum valve.

12. A structure as in claim 11, wherein said control signal is derived by sensing the current drawn by said associated machine.

13. A structure as in claim 12 including a timing device such that said vacuum remains applied to said associated shop machine for a predetermined period of time after said machine is turned off.

14. A structure as in claim 11 including a timing device such that said vacuum remains applied to said associated shop machine for a predetermined period of time after said machine is turned off.

15. A structure as in claim 11 which further comprises a dust sensor which causes said vacuum to continue to be applied to said associated machine after said machine is turned off until said sensor determines that the dust level has decreased to a predetermined threshold level.

16. A structure as in claim 11, wherein said switch comprises a first position for providing no power to said machine and a second position for providing power to said machine.

* * * * *